(12) United States Patent
Nakanishi et al.

(10) Patent No.: US 7,903,215 B2
(45) Date of Patent: Mar. 8, 2011

(54) LIQUID CRYSTAL DISPLAY AND METHOD OF MANUFACTURING THE SAME

(75) Inventors: Yohei Nakanishi, Kawasaki (JP);
Hiroyasu Inoue, Kawasaki (JP); Yuji Nakahata, Kawasaki (JP); Kengo Kanii, Kawasaki (JP); Kazutaka Hanaoka, Kawasaki (JP); Masakazu Shibasaki, Kawasaki (JP); Yuichi Inoue, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 738 days.

(21) Appl. No.: 11/804,672

(22) Filed: May 18, 2007

(65) Prior Publication Data

US 2007/0291207 A1 Dec. 20, 2007

Related U.S. Application Data

(62) Division of application No. 10/892,028, filed on Jul. 15, 2004, now Pat. No. 7,274,425, which is a division of application No. 10/354,916, filed on Jan. 30, 2003, now Pat. No. 6,781,665.

(30) Foreign Application Priority Data

Feb. 4, 2002 (JP) .................... 2002-027485
Mar. 19, 2002 (JP) .................... 2002-077216
Mar. 19, 2002 (JP) .................... 2002-077217

(51) Int. Cl.
*G02F 1/1337* (2006.01)
*G02F 1/1333* (2006.01)
(52) U.S. Cl. .................... 349/124; 349/94
(58) Field of Classification Search .................... None
See application file for complete search history.

(56) References Cited

U.S. PATENT DOCUMENTS

| 5,380,459 | A | * | 1/1995 | Kanemoto et al. | 252/299.01 |
| 5,674,576 | A | | 10/1997 | Gotoh et al. | 428/1.2 |
| 5,698,134 | A | | 12/1997 | Jubb et al. | 252/299.1 |
| 5,709,911 | A | | 1/1998 | Onishi et al. | |
| 5,892,560 | A | * | 4/1999 | Yoshida et al. | 349/89 |
| 5,959,707 | A | | 9/1999 | Murai et al. | 349/129 |
| 6,256,082 | B1 | | 7/2001 | Suzuki et al. | |
| 6,501,524 | B1 | | 12/2002 | Yoshida et al. | |
| 6,583,835 | B1 | | 6/2003 | Yoshida et al. | |
| 6,642,984 | B1 | | 11/2003 | Yoshida et al. | |

(Continued)

FOREIGN PATENT DOCUMENTS

EP 0 903 392 A1 9/1998

(Continued)

*Primary Examiner* — James A Dudek
(74) *Attorney, Agent, or Firm* — Greer, Burns & Crain, Ltd.

(57) ABSTRACT

The invention relates to a liquid crystal display in which a polymeric component included in a liquid crystal layer is polymerized while adjusting a voltage applied to the liquid crystal layer to regulate the direction of alignment of liquid crystal molecules during polymerization and a method of manufacturing the same. The invention provides a liquid crystal display in which image sticking is mitigated and a method of manufacturing the same. In a method of manufacturing a liquid crystal display in which a liquid crystal composition including a polymeric component that is optically or thermally polymerized is sealed between substrates and in which the polymeric component is polymerized while applying a voltage to the liquid crystal composition to regulate the direction of alignment of liquid crystal molecules during driving, a configuration is employed such that a polymerization initiator in the liquid crystal composition has a concentration x that satisfies $0 \leq x \leq 0.002$ (% by weight).

7 Claims, 9 Drawing Sheets

U.S. PATENT DOCUMENTS

| | | |
|---|---|---|
| 6,836,313 B2 | 12/2004 | Ishizaki ........................ 349/193 |
| 2002/0097362 A1 | 7/2002 | Yamada et al. ............... 349/130 |
| 2003/0090617 A1 | 5/2003 | Kawamoto et al. ........... 349/187 |

FOREIGN PATENT DOCUMENTS

| | | |
|---|---|---|
| JP | 04-199028 | 7/1992 |
| JP | 06-110045 | 4/1994 |
| JP | 06-265860 | 9/1994 |
| JP | 06-347795 | 12/1994 |
| JP | A 7-110469 | 4/1995 |
| JP | 08-292454 | 11/1996 |
| JP | 11-109393 | 4/1999 |
| JP | 11-119263 | 4/1999 |
| JP | 11-142831 | 5/1999 |
| JP | 11-183881 | 7/1999 |
| JP | 11-249118 | 9/1999 |
| JP | 2000-019565 | 1/2000 |
| JP | A 2000-162603 | 6/2000 |
| JP | 2000-305100 | 11/2000 |
| JP | 2001-100212 | 4/2001 |
| JP | 2001-311951 | 11/2001 |
| KR | 10-0222217 | 10/1999 |
| KR | 2000-0047468 A | 7/2000 |
| WO | WO 01/37036 A1 | 5/2001 |

\* cited by examiner

LIQUID CRYSTAL DISPLAY AND METHOD OF MANUFACTURING THE SAME

This is a divisional of application Ser. No. 10/892,028, filed Jul. 15, 2004, now U.S. Pat. No. 7,274,425 which is a divisional of application Ser. No. 10/354,916, filed Jan. 30, 2003, now U.S. Pat. No. 6,781,665.

BACKGROUND OF THE INVENTION

Field of the Invention

The present invention relates to a liquid crystal display (LCD) in which a liquid crystal material including a polymeric component (a monomer or oligomer) that is optically or thermally polymerized is sealed between substrates and in which the polymeric component is polymerized to form a polymer while adjusting a voltage applied to the liquid crystal layer (the applied voltage may be zero, and this operating may be hereinafter simply stated as "while applying a voltage" as occasions demand), the direction of alignment of liquid crystal molecules being regulated during driving by the alignment regulating capability of the polymer, the invention also relating to a method of manufacturing the same.

Referring to liquid crystal displays utilizing an active matrix according to the related art, TN (twisted nematic) mode liquid crystal displays are widely used in which a liquid crystal material having positive dielectric constant anisotropy is aligned horizontally on a substrate surface such that it is twisted at 90 degrees. between substrates that are opposite to each other in a dark state. Such TN mode liquid crystal displays have a problem in that they have poor viewing angle characteristics, and various studies have been made to improve the viewing angle characteristics.

IPS mode (in-plane-switching mode) liquid crystal displays (hereinafter briefly referred to as IPS-LCDs) in which a liquid crystal having positive dielectric constant anisotropy is horizontally aligned and applied with a transverse electric field are known as liquid crystal displays that are better than TN mode liquid crystal display according to the related art in viewing angle characteristics. However, liquid crystal molecules are switched in a horizontal plane with a comb-shaped electrode in an IPS-LCD, and there is a need for a backlight unit having high optical intensity because the comb-shaped electrode reduces the aperture ratio of pixels significantly.

On the contrary, multi-domain vertical alignment mode liquid crystal displays (hereinafter briefly referred to as MVA-LCDs) are known in which a liquid crystal having negative dielectric constant anisotropy is vertically aligned and in which banks (linear protrusions) are provided on a substrate or blanks (slits) are provide in an electrode as an alignment regulating structure. An MVA-LCD exhibits excellent viewing angle characteristics because it is provided with an alignment regulating structure which makes it possible to control the alignment of the liquid crystal such that it is oriented in a plurality of orientations when a voltage is applied without performing any rubbing process on alignment film.

However, the optical transmittance of the panel of an MVA-LCD is lower than that of a TN mode LCD although the reduction in the substantial aperture ratio of the pixels attributable to the protrusions or slits is not as significant as that caused by the comb-shaped electrode of an IPS-LCD. For this reason, MVA-LCDs and IPS-LCDs are presently considered unsuitable for notebook type PCs for which low power consumption is a must.

MVA-LCDs according to the related art have a problem in that it appears dark when displaying white because of low luminance. This is principally attributable to the fact that dark lines appear above protrusions or slits that are boundaries between separate alignments to reduce transmittance during white display and to consequently present dark appearance. Although this problem can be mitigated by maintaining sufficient intervals between the protrusions or slits, since this results in a decrease in the number of the protrusions or slits that are alignment regulating structures, another problem arises in that response time is increased because it takes a long time to stabilize the alignment of the liquid crystal when a predetermined voltage is applied.

In order to solve this problem and to provide an MVA-LCD having high luminance capable of high speed response, a method has been proposed in which the direction of alignment of liquid crystal molecules during driving is regulated using a polymer. According to the method of regulating the direction of alignment of liquid crystal molecules during driving using a polymer, a liquid crystal material that is a liquid crystal mixed with a polymeric component such as a monomer or oligomer (hereinafter briefly referred to as a monomer) is sealed between substrates. The monomer is polymerized into a polymer with the liquid crystal molecules tilted by applying a voltage between the substrates. This provides a liquid crystal layer that is tilted at a predetermined pretilt angle even when voltage application is stopped. A material that is polymerized by heat or light (ultraviolet rays) is chosen as the monomer.

However, in the case of an MVA-LCD manufactured according to the method of regulating the alignment direction of liquid crystal molecules during driving using a polymer, when an image is displayed for a long time, the image can remain visible (image sticking) even when the display is switched. This problematically reduces display quality.

SUMMARY OF THE INVENTION

The invention provides a liquid crystal display whose display characteristics are easily and reliably improved to achieve highly reliable display by mitigating image sticking that is caused by the method of regulating the alignment direction of liquid crystal molecules during driving using a polymer and provides a method of manufacturing the same.

The above-described problem is solved by a liquid crystal display in which a liquid crystal material is sealed between two substrates provided opposite to each other, characterized in that the liquid crystal material includes a polymeric component that is optically or thermally polymerized, a polymerization initiator, and a liquid crystal composition and in that the polymerization initiator in the liquid crystal material has a concentration x that satisfies $0 \leq x \leq 0.002$ (% by weight).

THE DESCRIPTION OF THE PREFERRED EMBODIMENTS

Figure 1:
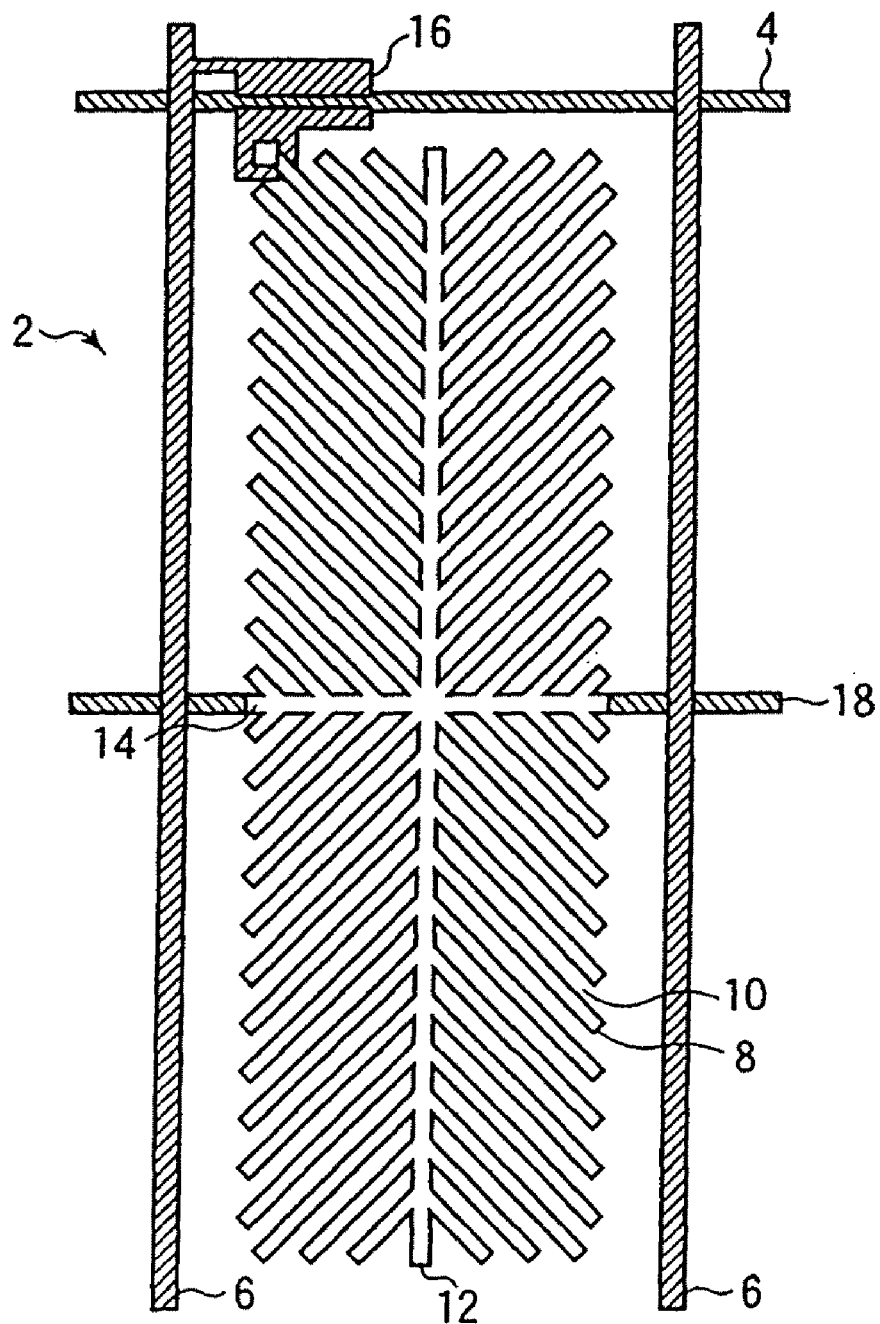
FIG. 1 schematically illustrates a liquid crystal display and a method of manufacturing the same in a first mode for carrying out the invention.

A liquid crystal display and a method of manufacturing the same in a first mode for carrying out the invention will now be described with reference to FIGS. 1 to 4. First, the liquid crystal display and the method of manufacturing the same in the present mode for carrying out the invention will be schematically described with reference to FIG. 1. FIG. 1 shows a pixel 2 of the liquid crystal display in the present mode for carrying out the invention as viewed in a direction normal to a surface of the substrate of the same. The pixel 2 is formed in a rectangular region that is defined by gate bus lines 4 and drain bus lines 6 that intersect each other with an insulation film which is not shown interposed therebetween. At the top left part of the pixel 2 in the figure, there is formed a TFT 16 that serves as a switching element when a gray scale voltage is applied to a pixel electrode to be described later. In the pixel 2, connection electrodes 12 and 14 are formed like a cross to divide the pixel into four domains of alignment having the same rectangular outline configuration. The connection electrode 12 is formed substantially in the middle of the pixel 2 in parallel with the drain bus lines 6, and the connection electrode 14 is formed on a storage capacitor bus line 18 that extends across the pixel 2 substantially in the middle thereof.

A plurality of stripe-like electrodes 8 that are fine electrode patterns are repeatedly formed substantially at an angle of 45 degrees to the connection electrodes 12 and 14. A pixel electrode is formed by the connection electrodes 12 and 14 and the plurality of stripe-like electrodes 8. The top left stripe-like electrodes 8 in the figure are electrically connected to a source electrode of the TFT 16. A space 10 is formed between stripe-like electrodes 8 that are adjacent to each other, the space being in the form of a blank between the electrodes. An alignment regulating structure is formed by the stripe-like electrodes 8 and the spaces 10. Obviously, fine linear protrusions may be formed on the pixel electrode that is formed on the entire surface in the pixel 2 instead of the stripe-like electrodes 8 and the spaces 10 in FIG. 1. Although not shown, an insulating structure or slits (that are obtained by removing some parts of a common electrode through patterning) may obviously be formed on an opposite substrate in association with the alignment regulating structure formed on the pixel electrode.

After forming such a fine line-and-space pattern on the pixel electrode of the pixel 2 in the TFT substrate, vertical alignment films are formed on surfaces of the TFT substrate and an opposite substrate facing each other. While various materials may be used for the vertical alignment films, polyamic acid type alignment films may be used, for example.

The two substrates are then combined with a negative liquid crystal having negative dielectric constant anisotropy sealed therebetween. The negative liquid crystal contains a polymeric component in a predetermined ratio. A diacrylate monomer is used as the polymeric component.

Figure 2:
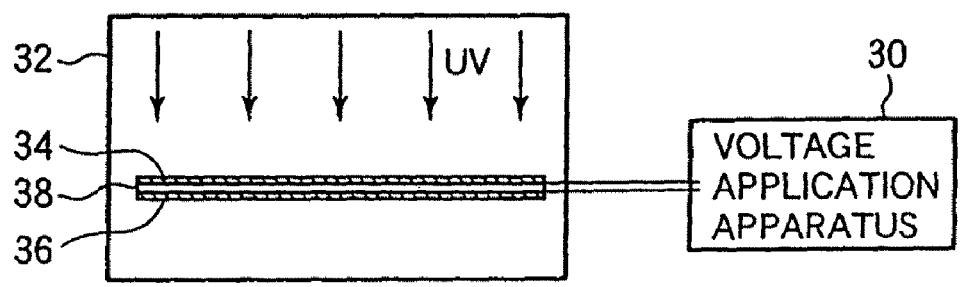
FIG. 2 shows a step of irradiating a liquid crystal layer of an LCD panel with ultraviolet rays with a voltage applied thereto.

FIG. 2 shows a step in which the liquid crystal layer of the LCD panel is irradiated with ultraviolet rays with a voltage applied thereto. As shown in FIG. 2, the LCD panel is placed in a chamber of an ultraviolet irradiation apparatus 32. Liquid crystal molecules in the liquid crystal composition are aligned substantially perpendicularly to the substrate surface before the monomer in the LCD panel is polymerized. Next, a voltage is applied between electrodes 34 and 36 which are provided on the substrates of the LCD panel from a voltage application apparatus 30. Thus, the voltage is applied to a liquid crystal layer 38 sealed between the electrodes 34 and 36 to tilt liquid crystal molecules in the pixel 2 in a predetermined direction. The surface of the LCD panel is irradiated with ultraviolet rays (UV rays) from a high pressure mercury lamp (not shown) of the ultraviolet irradiation apparatus 32 while keeping applying the voltage from the voltage application apparatus 30. As a result, the liquid crystal material added with a monomer is irradiated with ultraviolet rays to polymerize the monomer into a polymer which regulates the direction of alignment of the liquid crystal molecules during normal driving.

Figure 3:
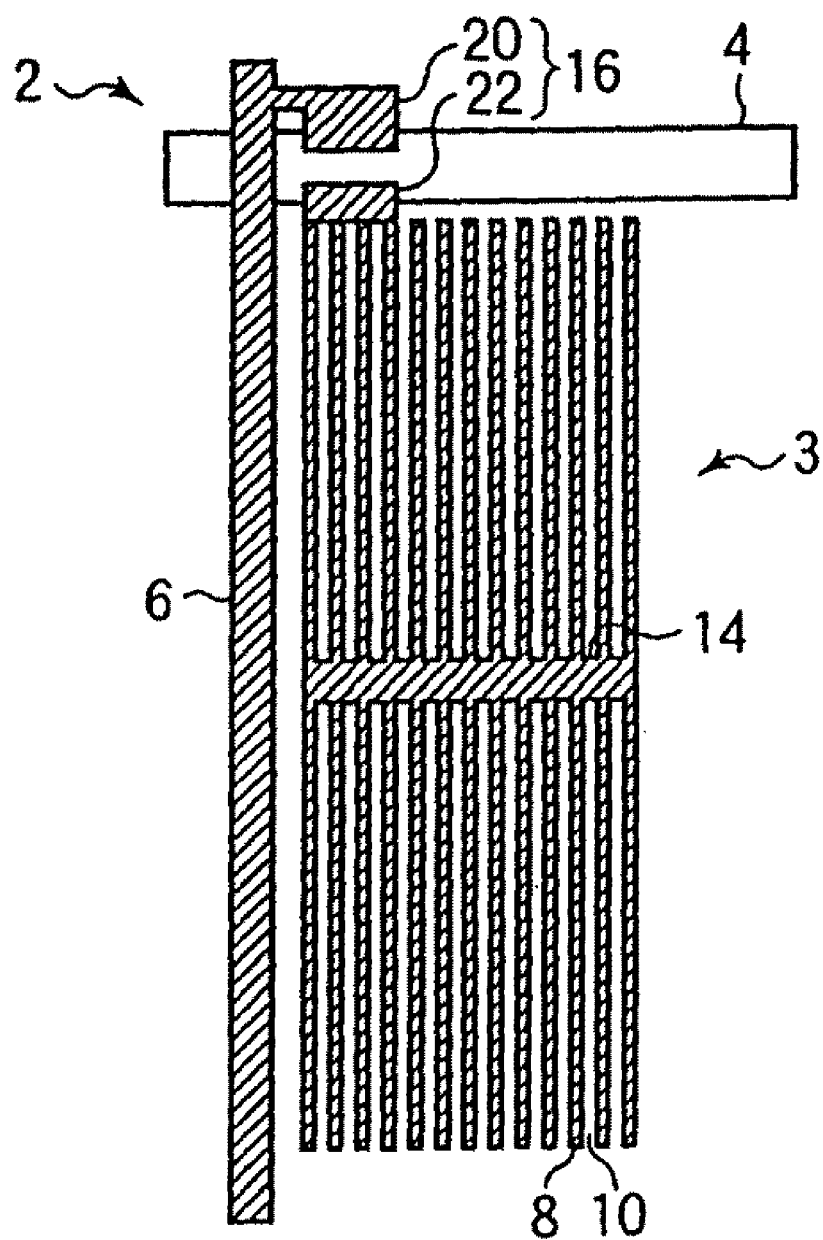
FIG. 3 schematically illustrates another liquid crystal display and a method of manufacturing the same in the first mode for carrying out the invention.

FIG. 3 shows a pixel 2 of an MVA-LCD having a different configuration as viewed in a direction normal to a surface of the substrate thereof. The configuration shown in FIG. 3 is characterized in that a pixel electrode 3 on a TFT substrate on which a TFT 16 is formed is a stripe-like electrode having a line-and-space pattern. As shown in FIG. 3, the pixel electrode 3 has stripe-like electrodes 8 and spaces 10 that are formed in a line-and-space pattern in parallel with a drain bus line 6.

The stripe-like electrodes 8 are electrically connected by a connection electrode 14 that is formed substantially in the middle of the pixel 2 in parallel with a gate bus line 4. Some of the stripe-like electrodes 8 are connected to a source electrode 22 provided in a face-to-face relationship with a drain electrode 20 of the TFT 16.

A linear protrusion extending in parallel with the gate bus line 4 is formed in a position on an opposite substrate that is not shown, the position facing the connection electrode 14 in the middle of the pixel region. The direction in which the alignment of liquid crystal molecules is to be regulated can be more clearly determined by the linear protrusion.

A liquid crystal material added with a monomer is irradiated with ultraviolet rays to polymerize the monomer with the liquid crystal molecules in the pixel 2 tilted in a predetermined direction by applying a voltage to the liquid crystal layer (not shown) in the same manner as that in the configuration shown in FIG. 2, which makes it possible to stabilize a pretilt angle and/or alignment direction of the liquid crystal molecules.

Various monomers, polymerization initiators, and liquid crystal compositions (liquid crystal molecules) were studied in an intention to mitigate image sticking in LCDs manufactured using the above-described method of manufacture attributable to the use of the method of regulating the alignment direction of liquid crystal molecules during driving using a polymer. As a result, it was revealed that a polymerization initiator causes image sticking, although the initiator is effective in reducing the optimum irradiation amount of ultraviolet rays to improve production efficiency. In the case of an LCD in which the alignment direction of liquid crystal molecules during the application of a voltage is regulated using a polymer, the LCD has more significant image sticking on images displayed thereby when it is completed, the higher the concentration of the polymerization initiator for promoting initiation of polymerization of the monomer when irradiated with ultraviolet rays, although the time required for polymerization is reduced. When no polymerization initiator is added in the liquid crystal material at all, the LCD has a lower level of image sticking on images displayed thereby when it is completed, although polymerization takes a longer time. Therefore, a polymerization initiator preferably has a low concentration in order to mitigate image sticking.

That is, image sticking can be reduced by adding no polymerization initiator for a monomer in a liquid crystal material or polymerizing the monomer with the initiator in a very small dose.

Let us assume that x represents the concentration of a polymerization initiator in a liquid crystal material before polymerization (in % by weight, which applies to the following concentrations); y represents the concentration of a monomer in the liquid crystal material before polymerization; z represents the concentration of a liquid crystal composition in the liquid crystal material before polymerization; and α represents an image sticking rate. Then, the concentration x of the polymerization initiator preferably satisfies $0 \leq x \leq 0.002$ (% by weight). In particular the image sticking rate α is minimized when x=0. The monomer concentration y is desirably in the range from 0.1 to 10% by weight inclusive in consideration to the image sticking rate α.

The image sticking rate α is determined as follows. A black-and-white checker pattern is displayed on a display area of an LCD for a long time. Then, a predetermined halftone is displayed throughout the display area; a difference (β−γ) between luminance β of regions where white has been displayed and luminance γ of regions where black has been displayed is identified; and the luminance difference (β−γ) is divided by the luminance γ of the regions where black has been displayed to determine the image sticking rate.

That is:

Image sticking rate $\alpha = ((\beta-\gamma)/\gamma) \times 100 (\%)$

Figure 4:
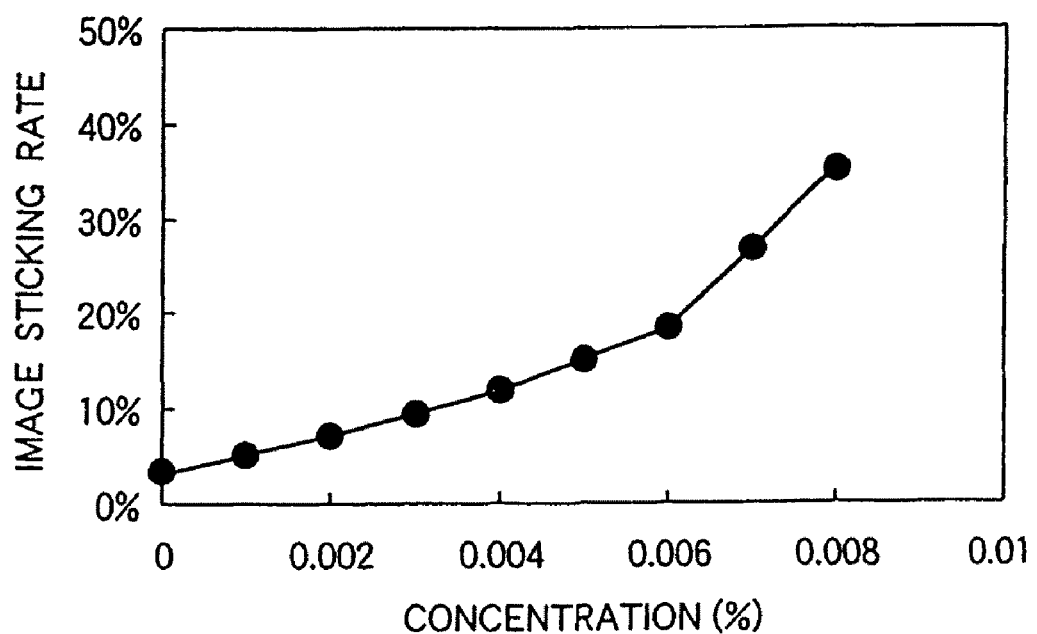
FIG. 4 shows a relationship between the concentration of a polymerization initiator and an image sticking rate in the first mode for carrying out the invention.

FIG. 4 shows a relationship between the concentration of a polymerization initiator and the image sticking rate. FIG. 4 shows the concentration (% by weight) of a polymerization initiator on the abscissa axis thereof and shows the image sticking rate (%) on the ordinate axis thereof. As described above, the concentration of a polymerization initiator is preferably 0.002% by weight or less, and the image sticking rate α is minimized when no polymerization is added in a liquid crystal material at all. For a common viewer, an LCD has no practical problem when it has an image sticking rate α of about 5 to 6%, and image sticking becomes noticeable at a rate of about 10%. The graph in FIG. 4 shows that the image sticking rate is 6% or less when the concentration of the polymerization initiator is 0.002% by weight or less, and which provides characteristics that are practically acceptable. An image sticking rate α as very low as about 3% can be achieved in the case of a polymerization initiator concentration of 0%, i.e., when no polymerization initiator is used.

A liquid crystal display and a method of manufacturing the same in the present mode for carrying out the invention will now be specifically described with reference to embodiments of the same and a comparative example. MVA-LCDs having the structure shown in FIG. 1 are used in the embodiments in the present mode for carrying out the invention and the comparative example. Specifically, vertical alignment films are formed, and the liquid crystal has negative dielectric constant anisotropy. Two polarizers facing each other with two substrates interposed therebetween are provided in a crossed Nicols configuration to enable the normally black mode in which black is display when no voltage is applied. Polarization axes of the polarizers which are not shown are in directions substantially in parallel with or perpendicular to bus lines. The LCDs have a diagonal panel size of 15 inches and resolution according to XGA.

Embodiment 1

A liquid crystal material was sealed between substrates, the liquid crystal material being obtained by mixing a liquid crystal composition having an average molecular weight of about 350 with 0.3% by weight of photo-setting diacrylate monomer having a molecular weight of about 350 and 0.006% by weight of polymerization initiator. Next, the monomer was polymerized with a voltage applied to the liquid crystal layer to cause it to memorize the tilting direction of the liquid crystal molecules. The ultraviolet rays for polymerizing the monomer were radiated at the room temperature (20° C.) with irradiation energy of 10 J/cm$^2$ (they were radiated using the same ultraviolet irradiation apparatus as that used in the following comparative example 1 for a time that is ten times the ultraviolet irradiation time of the comparative example 1). The MVA-LCD thus completed was caused to display a black-and-white checker pattern for 48 hours, and the image sticking rate α of the same was thereafter measured at 15%.

Embodiment 2

A liquid crystal material was sealed between substrates, the liquid crystal material being obtained by mixing a liquid crystal composition having an average molecular weight of about 350 with 0.3% by weight of photo-setting diacrylate monomer having a molecular weight of about 350 and no polymerization initiator. Next, the monomer was polymerized with a voltage applied to the liquid crystal layer to cause it to memorize the tilting direction of the liquid crystal molecules. The ultraviolet rays for polymerizing the monomer were radiated at the room temperature (20° C.) with irradiation energy of 100 J/cm$^2$ (they were radiated using the same ultraviolet irradiation apparatus as that used in the following comparative example 1 for a time that is one hundred times the ultraviolet irradiation time of the comparative example 1). The MVA-LCD thus completed was caused to display a black-and-white checker pattern for 48 hours, and the image sticking rate α of the same was thereafter measured at 3%.

Comparative Example 1

A liquid crystal material was sealed between substrates, the liquid crystal material being obtained by mixing a liquid crystal composition having an average molecular weight of about 350 with 0.3% by weight of photo-setting diacrylate monomer having a molecular weight of about 350 and 0.008% by weight of polymerization initiator. Next, the monomer was polymerized with a voltage applied to the liquid crystal layer to cause it to memorize the tilting direction of the liquid crystal molecules. The ultraviolet rays for polymerizing the monomer were radiated at the room temperature (20° C.) with irradiation energy of 1 J/cm$^2$. The MVA-LCD thus completed was caused to display a black-and-white checker pattern for 48 hours, and the image sticking rate α of the same was thereafter measured at 35%.

The LCD panels exhibited substantially the same optical characteristics under any of the conditions after they were irradiated with ultraviolet rays. As apparent from Embodiments 1 and 2 and the comparative example 1, when the concentration of a polymerization initiator is low or when no polymerization initiator is added at all, image sticking of images displayed by a completed LCD can be significantly reduced.

[Second Mode for Carrying Out the Invention]
(Principle)

First, the principle of a second mode for carrying out the invention will be described.

The inventors have been developing an alignment regulating technique in which a monomer that is optically or thermally polymerized is mixed in a liquid crystal and is polymerized with a predetermined voltage applied between substrates to achieve stable alignment as a technique for improving MVA-LCDs, i.e., improving the aperture ratio of the same to increase brightness and reducing the cost of the same.

However, it was revealed that the alignment regulating technique problematically causes a liquid crystal panel to perform poorly with respect to image sticking when it is driven compared to a panel that does not employ a setting method utilizing a monomer material.

Although no practical problem occurs when an image sticking rate α of about 5 to 6% is achieved in the same way as that in the first mode for carrying out the invention, an image sticking rate α of about 10% results in image sticking that is noticeable and no longer ignorable to a user.

Normally, a liquid crystal display is driven by applying a AC voltage to the liquid crystal layer in order to prevent image sticking. However, since the pair of substrates sandwiching the liquid crystal layer have different layered structures and different electrodes, a polarity is generated between the substrates to affect the AC voltage. As a result, even when an AC voltage of a constant value is applied to the liquid crystal display from an external voltage application apparatus, the voltage applied to the liquid crystal layer will have two different values because of switching of the AC voltage. A change in the voltage causes a change in the alignment or state of the liquid crystal.

Therefore, when an AC voltage having a frequency of 30 Hz for normal driving is applied to the liquid crystal layer and a polymer structure for controlling alignment is formed with the voltage kept applied, the alignment direction will be defined with irregularities in alignment attributable to instantaneous voltage changes left unremoved. Irregularities in alignment cause image sticking on the liquid crystal display to reduce the display characteristics of the same.

The inventors thought of increasing the frequency of an AC voltage to be applied to a liquid crystal layer in order to prevent image sticking.

Figure 5:
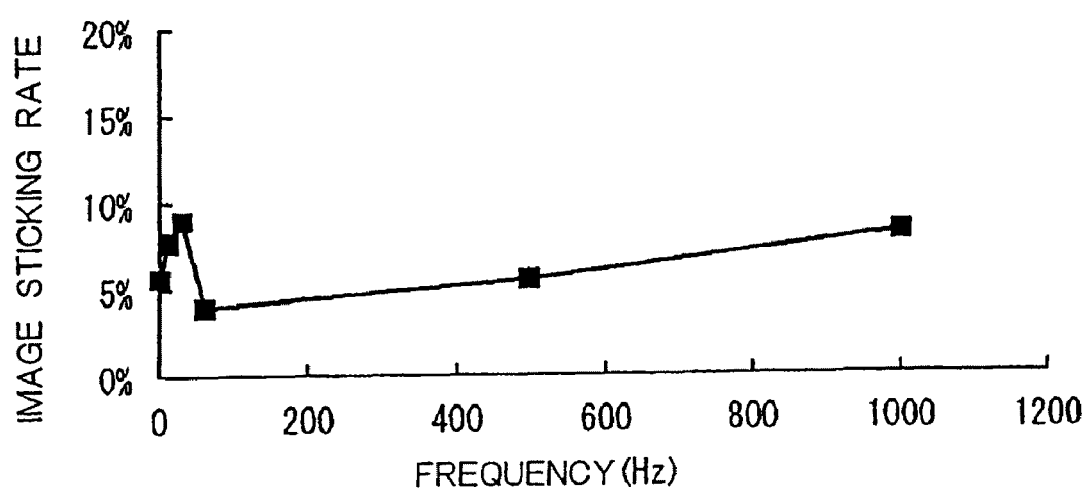
FIG. 5 is a characteristic diagram showing a relationship between frequencies of an AC voltage and image sticking rates.

An examination of a relationship between AC voltage frequencies and the image sticking rate α revealed that the image sticking rate α is at a minimum value of 5% or less at a AC voltage frequency of 60 Hz, as shown in FIG. 5. Since the image sticking rate α gradually increases at higher frequencies (the sticking rate at 1 kHz substantially equals that at a frequency of 30 Hz), a proper frequency range is from 60 Hz to 1 kHz.

Such changes in the image sticking rate α are attributable to the fact that the speed of response of liquid crystal molecules becomes unable to follow the speed of switching of the AC voltage when the AC voltage frequency is greater than that for normal driving, e.g., twice the same (60 Hz). Thus, the alignment of the liquid crystal molecules is defined depending on the state of the same at intervals between switching of the AC voltage instead of depending on the switching of the AC voltage. By forming a polymer in this state, a liquid crystal display can be obtained which has less image sticking, no irregularity of alignment, and good display characteristics.

Embodiment

Figure 6:
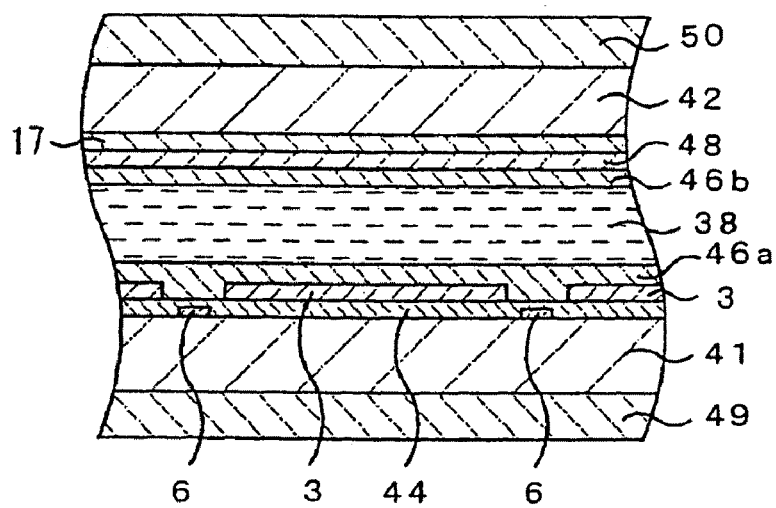
FIG. 6 is a sectional view showing major features of a liquid crystal display in a second mode for carrying out the invention.

A specific embodiment will now be described based on the above-described principle of the present mode for carrying out the invention. The description will be made on a liquid crystal display having major features as shown in FIG. 6.

The liquid crystal display is constituted of a pair of transparent glass substrates 41 and 42 facing each other with a predetermined interval left therebetween and a liquid crystal layer 38 sandwiched by the transparent glass substrates 41 and 42. The transparent glass substrates 41 and 42 are combined and fixed with a sealing material that is not shown.

A plurality of pixel electrodes 3 constituted of ITOs and TFTs serving as active elements that are not shown are formed on the transparent glass substrate (TFT substrate) 41 with an insulation layer 44 interposed therebetween, and a transparent vertical alignment film 46a is formed such that it covers the pixel electrodes 3. Color filters 17 (and a black matrix that is not shown), a common electrode (an opposite electrode) 48, and a vertical alignment film 46b are formed on the other transparent glass substrate (opposite substrate) 42 in the order mentioned. The vertical alignment films 46a and 46b are matched such that they sandwich the liquid crystal layer 38; the glass substrates 41 and 42 are fixed with the sealing material; and polarizers 49 and 50 are provided outside the substrates 41 and 42, respectively. The pixel electrodes 3 are formed along with an active matrix (TFT matrix), and drain bus lines 6 to which drain electrodes of TFTs are connected are shown in the illustrated example. Although not shown, gate bus lines to which gate electrodes of the TFTs are connected are also formed. The electrodes may be provided on only one of the substrates.

Figure 7:
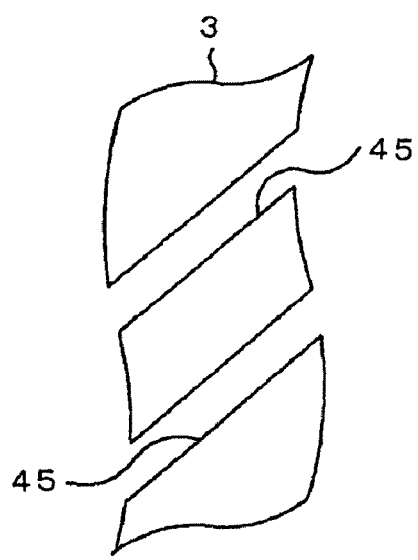
FIG. 7 is a plan view showing a part of a pixel electrode formed with fine slits for forming an alignment pattern.
Figure 8:
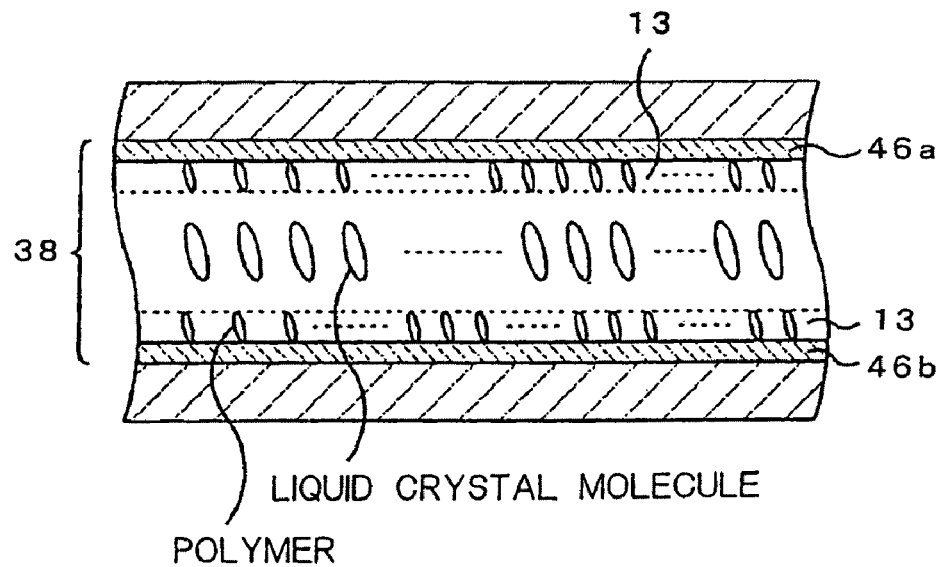
FIG. 8 is a sectional view showing how a liquid crystal layer is formed.

The liquid crystal layer 38 is formed by injecting a liquid crystal from a liquid crystal injection hole provided on the sealing material. A monomer that is optically or thermally polymerized is mixed in the liquid crystal. Further, the pixel electrodes 3 are formed with fine slits 45 for forming an alignment pattern as shown in FIG. 7, for example. As shown in FIG. 8, UV light irradiation or thermal processing is performed on the injected liquid crystal with a predetermined AC voltage, i.e., an AC voltage in the range from 60 Hz to 1 kHz in the present embodiment, applied thereto. The applied AC voltage is a rectangular wave, for example. As a result, the monomer is polymerized; polymer structures 13 that are regulated by the alignment pattern formed by the slits 45 are formed on surfaces of the liquid crystal layer 38 (surfaces of the vertical alignment films 46a and 46b); and liquid crystal molecules are aligned according to the alignment pattern under the regulation of the polymer structures 13.

In the present embodiment, a liquid crystal display having 1024×768 pixels at pixel pitches of 297 μm was actually fabricated.

TFT elements, drain bus lines, gate bus lines and pixel electrodes formed with fine slits for regulating alignment were formed on one of substrates (a TFT substrate). Color filters and a common electrode were formed on another substrate (opposite substrate). Glass substrates OA-2 (manufactured by NIPPON ELECTRIC GLASS CO., LTD.) having a thickness of 0.7 mm were used as the substrates. The fine slits were formed such that they extend in four directions from the center of a pixel (toward top right, bottom right, top left and bottom left parts of the same). The slits had a width of 3 μm and intervals of 3 μm. Vertical alignment films (made of polyimide) were formed on those substrates using a printing process, and a thermal process was performed on the same for 60 minutes at 180° C. The substrates were combined with spacers (manufactured by SEKISUI FINE CHEMICAL CO., LTD.) having a diameter of 4 μm interposed therebetween to fabricate an open cell. A liquid crystal having negative dielectric constant anisotropy added with a very small amount of a photo-polymeric monomer was injected in the cell thus obtained to fabricate a liquid crystal display panel. The dose of the photo-polymeric monomer was 0.3% by weight.

Next, the panel was irradiated with UV rays while applying an AC voltage (10 V) at a frequency of 60 Hz which was twice that for normal driving to the same, thereby setting the photo-polymeric monomer. The dose of irradiation was about 4000 mJ/cm$^2$ (the wavelength was 365 nm). There was no irregularity in the state of alignment in the pixels, and measurement carried out after displaying a black-and-white checker pattern for 48 hours revealed an image sticking rate α of 5%.

Comparative Example

A comparative example for the above embodiment will now be described. The comparative example is the same as the above embodiment except the following.

In setting a photo-polymeric monomer, it was irradiated with UV rays while applying an AC voltage (10 V) having an ordinary frequency of 30 Hz to the same.

In this case, some irregularities occurred in the state of alignment in pixels unlike the above embodiment, and measurement carried out after displaying a black-and-white checker pattern for 48 hours revealed an image sticking rate α of 10%.

As described above, the method of manufacturing a liquid crystal display in the present mode for carrying out the invention makes it possible to improve display characteristics easily and reliably without problems such as image sticking on display and to achieve display with high reliability.

[Third Mode for Carrying Out the Invention]
(Principle)

First, the principle of a third mode for carrying out the invention will be described.

As a technique for improving MVA-LCDs, i.e., improving the aperture ratio of the same to increase brightness and reducing the cost of the same, the inventors have been developing an alignment regulating technique in which a monomer that is optically or thermally polymerized is mixed in a liquid crystal and is polymerized with a predetermined voltage applied between substrates to form polymer structures having a predetermined alignment pattern on surfaces of the liquid crystal layer (surfaces of alignment films) and to achieve stable alignment of liquid crystal molecules with the polymer structures.

However, it was revealed that the alignment regulating technique problematically causes a liquid crystal panel to perform poorly with respect to image sticking when it is driven compared to a panel that does not employ a setting method utilizing polymer structures.

Although no practical problem occurs when an image sticking rate α of about 5 to 6% is achieved in the same way as that in the first mode for carrying out the invention, an image sticking rate α of about 10% results in image sticking that is noticeable and no longer ignorable to a user.

The inventors thought of controlling polymer structures such that they have small average surface roughness in order to prevent image sticking.

Results of an examination on a relationship between average surface roughness of polymer structures and the image sticking rate α are shown below.

In this case, a normally black mode configuration was provided by using vertical alignment films and a liquid crystal having negative dielectric constant anisotropy and applying polarizers on both sides of the liquid crystal panel in a crossed Nicols configuration. Any of monoacrylate, diacrylate and triacrylate was used as a polymeric monomer; a polymerization initiator of 0.01% by weight was used; and the polymeric monomer and the polymerization initiator were mixed to a total concentration of 0.3% by weight. Referring to polymerizing conditions, UV rays were used in a dose in the range from 4 to 10 J/cm$^2$.

Different combinations of the polymeric monomer and the polymerization initiator were mixed with a liquid crystal and were injected in a liquid crystal display. Thereafter, polymerization was performed while applying a voltage to the liquid crystal to adjust alignment of the same, and image sticking was evaluated. Then, the liquid crystal display was decomposed to observe surfaces of polymer structures formed therein with an atomic force microscope (AFM) and to study the relationship between average roughness of the same and the image sticking rate α.

Figure 9:
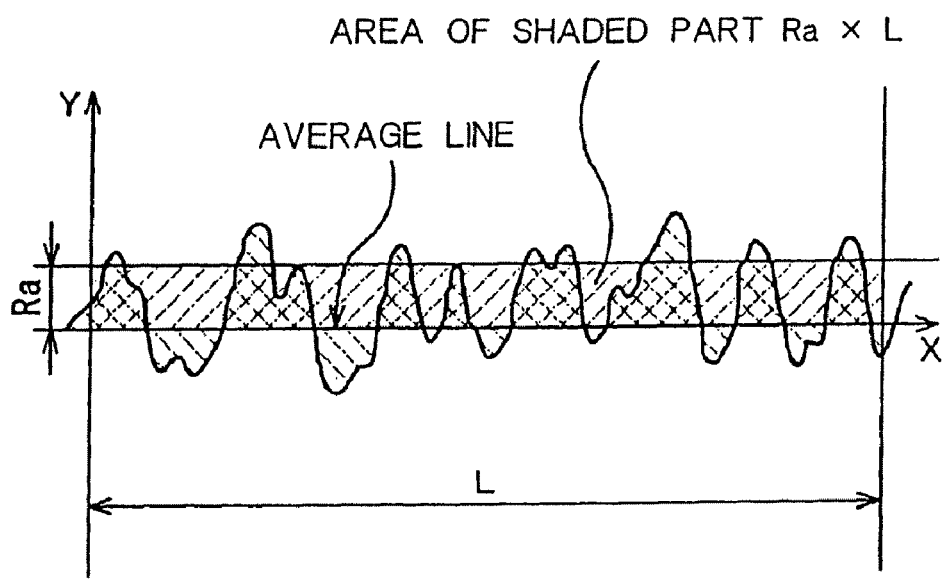
FIG. 9 schematically shows the definition of an average surface roughness.

The average roughness (Ra) is a value obtained from a roughness curve represented by y=f(x) according to the following equation and FIG. 9 in which the roughness curve is partially extracted in the direction of an average line of the same in a reference length and in which an X-axis represents the direction of the extracted average line and a Y-axis represents the direction of depth magnification (the definition is based on JIS 80601-1994 "Definition and Indication of Average Surface Roughness").

$$Ra=1/L\int_0^L |f(x)|dx \quad L: \text{reference length}$$

Figure 10:
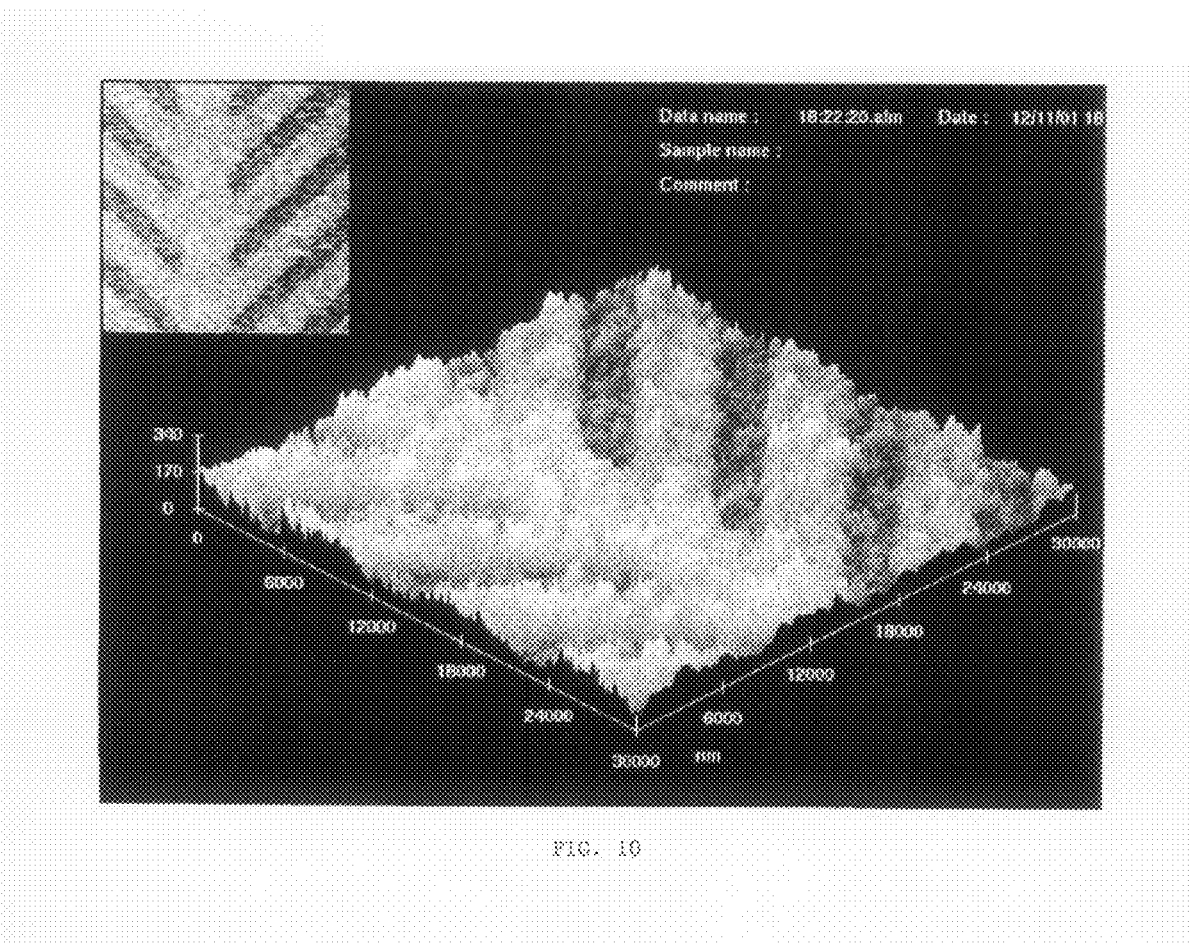
FIG. 10 is a microphotograph (AFM image) showing a polymer structure on pixel electrodes having slits on the side of a TFT substrate.
Figure 11:
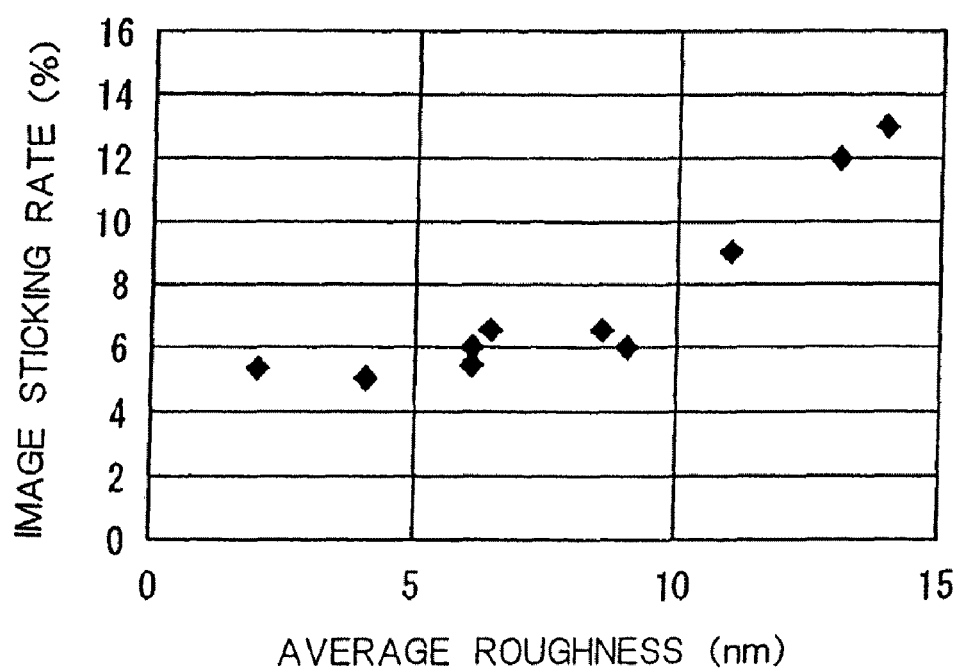
FIG. 11 is a characteristics diagram showing a relationship between average surface roughness of a polymer structure and image sticking rates.

FIG. 10 shows an AFM image of a polymer structure on pixel electrodes having slits on a TFT substrate (the irregularities on the surface are the polymer structure), and FIG. 11 shows a relationship between average roughness of the surface of the polymer structure and the image sticking rate α based on the AFM image.

As shown in FIG. 11, it was revealed that the image sticking rate α decreases with the average surface roughness and that an average surface roughness of 10 nm or less satisfactorily keeps the image sticking rate α in an allowable range to suppress image sticking characteristics below a practically acceptable level. Therefore, a liquid crystal display having good display characteristics can be provided by keeping the average surface roughness of a polymer films at 10 nm or less.

Further, results on an examination on combinations of concentrations of the polymeric monomer, concentrations of the polymerization initiator, and amount of irradiation of UV rays have indicated that the image sticking rate α can be suppressed to 6% or less.

Embodiment

A specific embodiment will now be described based on the above-described principle of the present mode for carrying out the invention with reference to FIGS. 6 to 8. The description will be made on a liquid crystal display having major features as shown in FIG. 6. Configurations of a TFT substrate and an opposite substrate will not be described because they are similar to those in the above-described specific embodiment in the second mode for carrying out the invention.

A liquid crystal layer 38 is formed by injecting a liquid crystal from a liquid crystal injection hole provided on a sealing material. A monomer that is optically or thermally polymerized is mixed in the liquid crystal. Further, for example, as shown in FIG. 7, pixel electrode 3 is formed with fine slits 45 forming an alignment pattern. As shown in FIG. 8, UV light irradiation or thermal processing is performed on the injected liquid crystal with a predetermined AC voltage applied thereto. As a result, the monomer is polymerized; polymer structures 13 that are regulated by an alignment pattern formed by slits 45 are formed on surfaces of the liquid crystal layer 38 (surfaces of vertical alignment films 46a and 46b); and liquid crystal molecules are aligned according to the alignment pattern under the regulation of the polymer structures 13. In the present embodiment, the polymer structures 13 are controlled such that they have a surface roughness of 10 nm or less.

In the present embodiment, a liquid crystal display having 1024×768 pixels at pixel pitches of 297 μm was actually fabricated.

TFT elements, drain bus lines, gate bus lines and pixel electrodes formed with fine slits for regulating alignment were formed on one of substrates (a TFT substrate). Color filters and a common electrode were formed on another substrate (opposite substrate). Glass substrates OA-2 having a thickness of 0.7 mm were used as the substrates. Vertical alignment films (made of polyimide) were formed on those substrates using a printing process, and a thermal process was performed on the same for 60 minutes at 180° C. The substrates were combined with spacers (manufactured by SEKISUI FINE CHEMICAL CO., LTD.) having a diameter of 4 μm interposed therebetween to fabricate an open cell. A liquid crystal was mixed with 0.3% by weight of photopolymeric diacrylate monomer having an average molecular weight of 350 and 0.01% by weight of DAROCUR 1173 (manufactured by CHIBA SPECIALTY CHEMICALS CO., LTD.) that is a polymerization initiator and injected into the open cell. Thereafter, the liquid crystal layer was irradiated with UV rays in an irradiation energy of 4 J/cm$^2$ with a voltage of 5V DC applied thereto to form polymer structures for controlling the alignment of the liquid crystal. At this time, the polymer structures had an average surface roughness of 6 nm.

As described above, the method of manufacturing a liquid crystal display in the present mode for carrying out the invention makes it possible to improve display characteristics easily and reliably without problems such as image sticking on display and to achieve display with high reliability.

The invention is not limited to the above-described modes for carrying out the same and may be modified in various ways.

For example, although diacrylate is used as a monomer in the above-described modes for carrying out the invention, this is not limiting the invention, and triacrylate may obviously be used as a polymeric component to serve as a polyfunctional polymer.

Although a monomer was described as an example of a polymeric component for stabilization of the alignment a liquid crystal utilizing a polymer in the above-described modes for carrying out the invention, this is not limiting the invention, and an oligomer or a mixture of an oligomer and a monomer may obviously be used as a polymeric component.

As described above, the invention makes it possible to improve display characteristics easily and reliably to achieve display with high reliability by mitigating image sticking originated in the method of regulating the direction of alignment of liquid crystal molecules during driving using a polymer.

What is claimed is:

1. A method of manufacturing a liquid crystal display in which a first substrate having a first electrode and a second substrate having a second electrode are provided opposite to each other with an alignment film and a liquid crystal layer interposed therebetween, the method comprising the steps of:
   sandwiching the liquid crystal layer that includes a liquid crystal mixed with a monomer for aligning liquid crystal molecules in a predetermined direction between the first substrate and the second substrate;
   polymerizing the monomer while applying an AC voltage between the substrates to form a polymer structure having a predetermined alignment pattern; and
   controlling the value of the frequency of the AC voltage such that the speed of switching of the AC voltage is higher than the speed of response of the liquid crystal molecules in regulating the alignment of the liquid crystal molecules with the polymer structure,
   wherein the frequency of the AC voltage is 60 Hz to 90 Hz.

2. A method of manufacturing a liquid crystal display according to claim 1, wherein the AC voltage is a rectangular wave.

3. A method of manufacturing a liquid crystal display according to claim 1, wherein the first electrode is formed with a slit for regulating the alignment pattern.

4. A method of manufacturing a liquid crystal display according to claim 1, wherein the monomer is polymerized by irradiating a light or performing a thermal process on the same to form the polymer structure.

5. A method of manufacturing a liquid crystal display in which a first substrate having a first electrode and a second substrate having a second electrode are provided opposite to each other with an alignment film and a liquid crystal layer interposed therebetween, the method comprising the steps of:
   sandwiching the liquid crystal layer that includes a liquid crystal mixed with a monomer for aligning liquid crystal molecules in a predetermined direction between the first substrate and the second substrate;
   polymerizing the monomer while applying an AC voltage at a frequency of 60 Hz to 90 Hz between the substrates to form a polymer structure having a predetermined alignment pattern; and
   controlling average surface roughness of the polymer structure such that it is 10 nm or less in regulating the alignment of the liquid crystal molecules with the polymer structure.

6. A method of manufacturing a liquid crystal display according to claim 5, wherein the first electrode is formed with a slit for regulating the alignment pattern.

7. A method of manufacturing a liquid crystal display according to claim 5, wherein the monomer is polymerized by irradiating a light or performing a thermal process on the same to form the polymer structure.

* * * * *